(No Model.)
B. E. TILDEN.
NUT LOCK.
No. 428,789. Patented May 27, 1890.
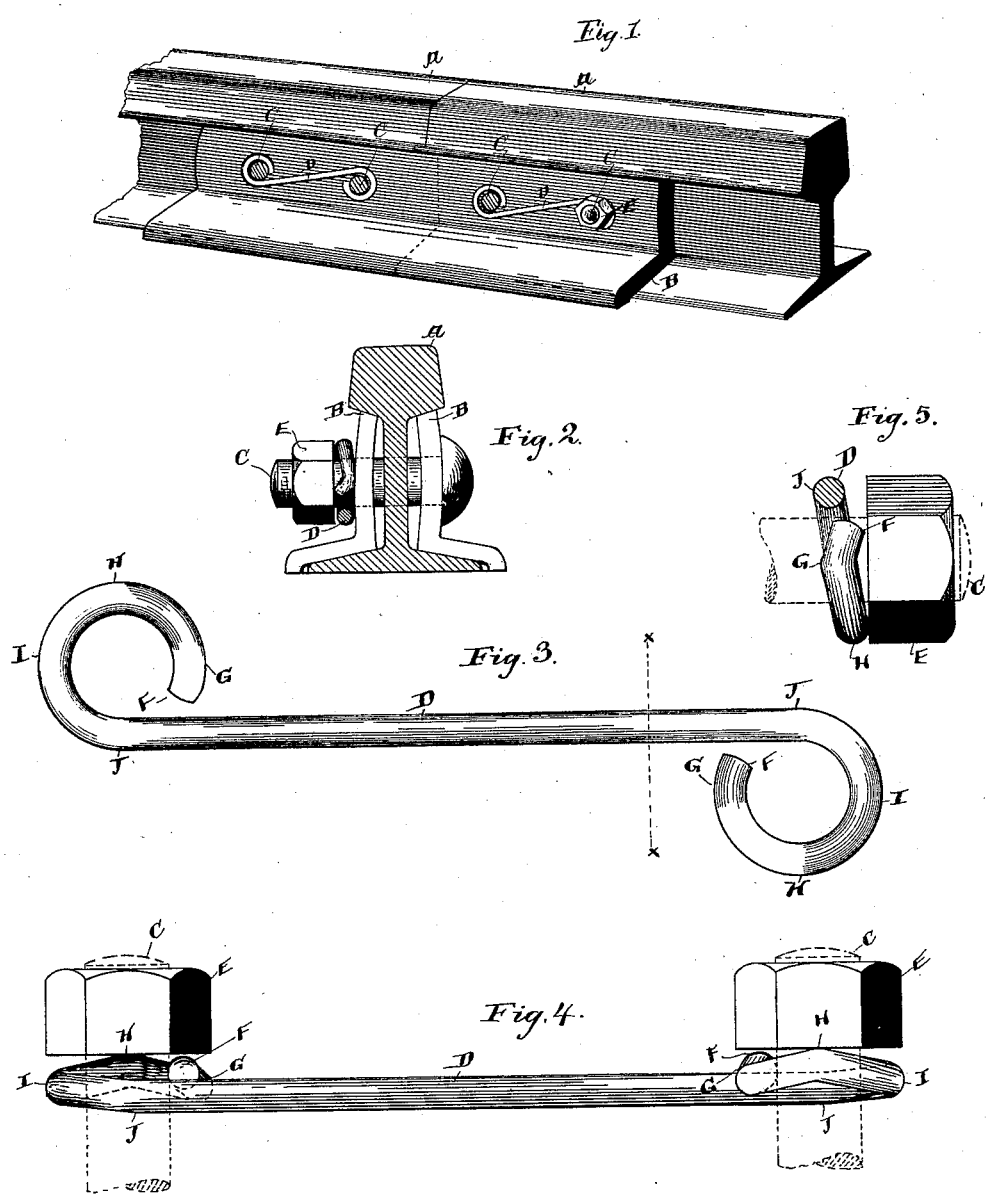
Witnesses
Inventor
Burt E. Tilden
By his Attorney
Frank Higley

UNITED STATES PATENT OFFICE.

BURT E. TILDEN, OF CLEVELAND, OHIO.

NUT-LOCK.

SPECIFICATION forming part of Letters Patent No. 428,789, dated May 27, 1890.

Application filed January 9, 1890. Serial No. 336,459. (No model.)

*To all whom it may concern:*

Be it known that I, BURT E. TILDEN, of Cleveland, in the county of Cuyahoga and State of Ohio, have invented a new and useful Improvement in Nut-Locks, of which the following is a specification.

My invention relates, particularly, to spring nut-locks for splice-bars or angle-bars used in connecting railroad-rails; but it may be employed in any place where bolts are used in pairs.

It consists in the novel form of construction of the nut-lock, by which a combined twist and spiral spring is obtained, and by which the wear upon the spring caused by tightening the nut is shifted from the sharp ratchet end of the spring to another portion of it.

My invention is shown in the accompanying drawings, in which—

Figure 1 is a side elevation showing the nut-lock in position to the rails of a railroad. Fig. 2 is a transverse section showing rail-connections and showing the end of nut-lock with nut screwed down to the nut-lock. Fig. 3 is a plan view of the nut-lock. Fig. 4 is a side view of the nut-lock, showing the form of the spiral ends of the nut-lock, and showing the bearing of the nut when first coming in contact with the nut-lock. Fig. 5 is an end view of the nut-lock, the same being cut off on the line *x x* of Fig. 3, and showing the same in position to a bolt with nut.

A A represent the ends of two rails which meet.

B B are angle-bars or splice-bars.

C C are bolts having nuts E E.

D represents the nut-locking device. The nut-lock D is made, preferably, of round or octagon wire, rod-steel, or other suitable metal, the ends being cut off either obliquely or at right angles to the axis of the bar to form a ratchet or biting point F. At both ends the bar is bent around, as shown in Fig. 3, approximately in a circle of suitable diameter to encircle the bolts C C. From the point J at either end, where the bar commences to bend, it rises above the line of the straight portion of the bar in approximately a spiral line to about the point H, farthest away from the line of the bar. From about the point H it takes a course below the spiral line to G, and thence an upward course to the ratchet or biting point F, which point is slightly below the point H of the spiral end of the nut-lock. When the nuts E E are brought to bear on the nut-lock thus constructed, the strain will first be upon the points H H of the nut-lock, as is shown in Figs. 4 and 5. As the nut is screwed down toward the splice-bar the spiral end will give at H and the ratchet end F will pry upward and come in contact with the nut E, as is shown in Fig. 2, and bite into the nut, thus preventing the nut from turning off, while it can be screwed down freely. In this manner of construction of the nut-lock a combined twist and spiral-spring pressure is brought to bear upon the two nuts E E, and an equal pressure will always be maintained upon the two nuts, thus preventing the unscrewing of either nut.

In the form of nut-lock in general use the portion of the nut-lock encircling the bolt is spiral in form and having its point of contact with the nut always upon the ratchet end. When the great pressure necessary to screw the nut down is brought to bear on this ratchet end, the same is worn away or crushed down parallel with the under surface of the nut. In my device the pressure is first brought to bear on the point H of the nut-lock, and it is only after the nut is partially screwed down that the ratchet end comes in contact with the nut, thus preventing much of the wear upon the ratchet end, and the form of the nut-lock between the point H and the end of the nut-lock is such that the ratchet end cannot be easily crushed down by the pressure of the nut.

What I claim as new, and desire to secure by Letters Patent, is—

1. The nut-lock D, consisting of a bar or rod of spring metal having ends bent around in nearly opposite directions to encircle the bolts C C, each end rising above the line of the bar in approximately a spiral line to about the point H, having depression at G and ending in a ratchet-point F below the point H, all substantially as and for the purposes shown.

2. In a nut-lock, the combined twist and spiral spring obtained by bending the ends of the bar or rod of spring metal around in nearly opposite directions to encircle the bolts C C, each of said ends rising above the line of the bar in approximately a spiral line to about the point H, which point is made the first point of contact with the nut, and having depression at G and ending in ratchet-point F, substantially as and for the purposes described.

BURT E. TILDEN.

Witnesses:
A. P. WINSLOW,
JOHN O. WINSHIP.